United States Patent
Lee

(10) Patent No.: US 9,592,962 B1
(45) Date of Patent: Mar. 14, 2017

(54) APPARATUS FOR ARRANGING AND TRANSFERRING AMMUNITION USING CONTROLLED MAGNETIC FORCE

(71) Applicant: POONGSAN CORPORATION, Pyeongtaek-si, Gyeonggi-do (KR)

(72) Inventor: Dong Hee Lee, Busan (KR)

(73) Assignee: POONGSAN CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 15/053,965

(22) Filed: Feb. 25, 2016

(30) Foreign Application Priority Data

Dec. 3, 2015 (KR) .................. 10-2015-0171226

(51) Int. Cl.
| | |
|---|---|
| B65G 17/46 | (2006.01) |
| B65G 17/48 | (2006.01) |
| B65G 21/20 | (2006.01) |
| B65G 47/34 | (2006.01) |

(52) U.S. Cl.
CPC ............. *B65G 17/48* (2013.01); *B65G 17/46* (2013.01); *B65G 21/2063* (2013.01); *B65G 47/34* (2013.01)

(58) Field of Classification Search
CPC ................................. B65G 17/46; B65G 47/30
USPC .................... 198/381, 464.2, 473.1
See application file for complete search history.

(56) References Cited

U.S. PATENT DOCUMENTS

| | | | |
|---|---|---|---|
| 3,880,420 A | 4/1975 | Martin | |
| 3,916,762 A | 11/1975 | Pierre et al. | |
| 4,882,972 A | 11/1989 | Raymond | |
| 5,117,962 A * | 6/1992 | Tommarello | H01J 9/2272 198/378 |
| 5,485,910 A * | 1/1996 | Oda | H01L 21/67709 198/690.1 |
| 8,596,184 B2 | 12/2013 | Lindskog | |

(Continued)

FOREIGN PATENT DOCUMENTS

| | | |
|---|---|---|
| JP | 11-322037 A | 11/1999 |
| JP | 2002-143717 A | 5/2002 |

(Continued)

*Primary Examiner* — Gene Crawford
*Assistant Examiner* — Lester Rushin
(74) *Attorney, Agent, or Firm* — Novick, Kim & Lee, PLLC; Jae Youn Kim

(57) ABSTRACT

An apparatus for arranging and transferring ammunition, includes a slope conveyor, which is configured into an endless track structure so as to lift cartridges placed on a transfer track thereof using magnetic force, a plurality of permanent magnets, which are arranged on the slope conveyor so as to create a magnetic field outside the transfer track, one or more hole sifters, which are disposed near an outer surface of the transfer track and which have cartridge passage holes formed at locations through which the plurality of permanent magnets pass, and magnetizing controllers including electromagnets, which are disposed above and under the hole sifters and are assigned to the plurality of permanent magnets, wherein the magnetizing controllers detect a position of the permanent magnet when the permanent magnet passes through the cartridge passage hole, and controls the electromagnets to create a magnetic field, having polarity, orientation and density at least one of which is controlled, above or under the hole sifters.

6 Claims, 14 Drawing Sheets

(56) References Cited

U.S. PATENT DOCUMENTS

2014/0326579 A1* 11/2014 Faul ..................... B65G 54/02
198/464.2

FOREIGN PATENT DOCUMENTS

| JP | 2005-170564 A | 6/2005 |
|----|---------------|--------|
| JP | 4657399 B2 | 3/2011 |
| KR | 10-0918529 B1 | 9/2009 |
| KR | 10-2014-0070908 A | 6/2014 |

* cited by examiner

APPARATUS FOR ARRANGING AND TRANSFERRING AMMUNITION USING CONTROLLED MAGNETIC FORCE

BACKGROUND OF THE INVENTION

Field of the Invention

The present invention relates to an apparatus for arranging and transferring ammunition, which is constructed to rapidly and evenly arrange cartridges, which are supplied in a disordered state and then to supply the cartridges side by side to a subsequent processing unit, using the tendency whereby a steel bullet fitted in a cartridge adheres to a magnet.

Description of the Related Art

Most ammunition is manufactured in a such a way as to charge propellant into a cartridge case, to fit a bullet into the cartridge case and to finally press the connected portion therebetween in a sealing manner. Cartridges manufactured in this way are commonly contained in a cart in a disordered state.

In order to execute quality inspection of individual cartridges, to manufacture a cartridge belt from cartridges, or to individually prepare packages containing cartridges numbering in the teens or several tens thereof, there is a need to load the cartridges onto a cart in an orderly arranged state in order to regularly and consecutively supply the cartridge.

As a critical process for supplying cartridges, which are disorderly loaded onto a cart, in an orderly manner, two arranging and transferring mechanisms, which are configured to first arrange cartridges in a consistent orientation such that the bullets in the cartridges are oriented in one direction and the tails of the cartridges are oriented in the opposite direction, to dispose the cartridges one by one in an orderly state and to transfer the orderly arranged cartridges arranged in an orderly manner, have been used since early times.

First referring to Patent Document 2, which discloses an arranging and transferring mechanism, which has been used since very early times, cartridges loaded into a hopper in a disorderly manner are normally or reversely rotated depending on the center of gravity while being moved along a spiral track and are placed one by one on a waiting circular shuttle. The circular shuttle, which is configured to have a radial shape, transfer the cartridges placed thereon to the opposite side, and loads the cartridges on a cartridge-supplying belt in an orderly manner.

The apparatus using the circular shuttle, which is shaped into a radial shape, is advantageous in that cartridges can be oriented in one direction regardless of the kind or material of the cartridges, as long as the bullet side of the cartridge is heavier than the tail side.

Meanwhile, if the cartridges to be handled are relatively long and thick, the shuttle needs to be enlarged in proportion to the size of the cartridges, and the radius of circular movement of the shuttle also needs to be increased. Hence, it is somewhat unsatisfactory to apply the mechanism to cartridges having a large diameter, that is, to long or heavy cartridges.

Patent Document 1, which discloses the technical base and the basic idea of the present invention, will now be described.

This technology is derived from the fact that most cartridges having a large diameter are armor-piercing cartridges, which are capable of penetrating armors and have bullets that are partially or entirely made of steel heads.

Specifically, a conveyor including magnets mounted on the transfer track thereof is disposed almost vertically, and cartridges adhered to the magnets are arranged in an orderly manner while being lifted in the state in which the bullets of the cartridges are directed upward. Thereafter, the cartridges, which have passed over the top of the conveyor, are supplied to a loading magazine by allowing the cartridges to fall one by one down a slide.

In other words, when a finished cartridge, in which a bullet is fitted in a cartridge case, is lifted by applying magnetic force to the steel head of the bullet, which tends to adhere to a magnet, the cartridge case, which is made of relatively heavy copper alloy and is thus not attracted to the magnet, naturally hangs down. Consequently, the cartridges can be oriented in one direction, and can be transferred in the oriented state through a conveyor.

By repeatedly disposing permanent magnets on the transfer track of a conveyer in an oblique fashion and lifting cartridges adhered to the permanent magnets, as in Patent Document 1, the cartridges can sequentially arrive at the top of the conveyor. Thereafter, the cartridges are separated from the permanent magnets in the order in which they arrive at the top, and fall down a slide having an outlet having a reduced width.

The cartridges, which have sequentially fallen down, are transferred side by side to a desired location through a loading magazine having a zigzag path without being arranged in a disordered manner.

RELATED ART DOCUMENTS

Patent Documents (Patent Document 1) Korean patent registration No. 10-0918529, entitled "ammunition-supplying apparatus" (Registration date: Sep. 15, 2009)

(Patent Document 2) Korean Unexamined Patent Publication No. 10-2014-0070908, entitled "ammunition inspection apparatus" (Publication date: Jun. 11, 2014)

SUMMARY OF THE INVENTION

The horizontal transfer type of arranging and transferring apparatus, which is equipped with the circular shuttle, has a disadvantage in that the size and radius of the shuttle have to be increased at a geometric rate with increased size of cartridges, and the load applied to a drive column for supporting and rotating the circular shuttle, which has a radial shape, is also steeply increased.

Meanwhile, the arranging and transferring apparatus using the magnetic slope conveyor is advantageous in that it is capable of flexibly responding to variance in the size and weight of cartridges and in that the space required for installation when handling cartridges having a large diameter is reduced compared to the apparatus employing the circular shuttle.

However, since only the bullet portion of a cartridge, which is capable of being adhered to a magnet and has a small surface area relative to the entire surface of the cartridge, is burdened with the total weight of the cartridge, there is still a disadvantage in that the bullet portion is easily separated from the magnet when there is interference between adjacent cartridges, thereby increasing the possibility that not all of the cartridges will succeed in being completely transferred.

If the magnetic force is simply increased in order to overcome the above disadvantage, however, the cartridge cases of cartridges do not hang by themselves, because cartridges are more intensively agglomerated or adhered to each other, thereby making it impossible to attain the originally intended arranging effects.

Therefore, it is an object of the present invention to provide a novel and enhanced apparatus, which is capable of comprehensively overcoming the above problems and the performance limits caused thereby, which occur in the conventional slope conveyor type of arranging and transferring apparatus.

The specific object of the present invention is to provide a high-performance apparatus for arranging and transferring ammunition, which is configured to appropriately arrange cartridges (which means sifting for screening cartridges using a sifter having a slit and holes), apply magnetic force suitable for transferring cartridges to precise locations so as to arrange cartridges while minimizing the number of cartridges that escape from a magnet, and release the application of magnetic force at an appropriate point after the completion of arrangement, thereby remarkably increasing processing speed to the point at which the cartridges are finally loaded or supplied.

As a result of intensive studies to solve the above problems and to achieve the above object of the present invention, the inventors of the present application discovered the fact that failure to arrange cartridges most often occurs in the procedure of separating a plurality of cartridges adhered to a permanent magnet while leaving only one cartridge adhered to the permanent magnet.

For example, the conventional Patent Document 1 employs only a physical separation mechanism using a hole sifter having cartridge passage holes (a sifter having holes) in order to lift only one cartridge, among multiple agglomerated cartridges. However, this technology is intended to merely allow only one cartridge, among two or three agglomerated cartridges, to pass through the cartridge passage hole owing to luck, and the possibility that all of the two or three cartridges will be separated from the permanent magnet is increased.

Accordingly, when one or more cartridges are adhered to one permanent magnet disposed on one conveyer unit, in order to divide the agglomerated cartridges into a cartridge to be selected and lifted and cartridges to be early recovered and to actually separate the one cartridge from the remaining cartridges, a magnetic field, polarities and the like, which are created at the contact area between a bullet and a permanent magnet or a conveyor unit, must be concretely understood.

First of all, the properties of a cartridge as a magnetic body, a permanent magnet and a conveyor unit are described.

Although every object may be considered to be a magnetic body because they are capable of being magnetized through the application of a very intensive magnetic field thereto, all substances may be classified into ferromagnetic substances, paramagnetic substances and diamagnetic substances depending on the electron spin structure of the electrons constituting the object.

The ferromagnetic substance (Mn, Co, Fe or the like) is the substance that is intensively magnetized in the magnetization direction when an external magnetic field is applied thereto and that holds the magnetized state even after the external magnetic field has been eliminated. This substance has a property of adhering to a magnet. Specifically, this substance is magnetized with the polarity opposite to that of a magnet when the substance comes into contact with the magnet, and is demagnetized and drawn to the magnet when the substance is separated from the magnet. In other words, the ferromagnetic substance may be a substance that becomes integral with a magnet when it is in contact with the magnet, but that becomes a non-magnetic substance, which is attracted into the magnetic field when it is separated from the magnet.

The paramagnetic substance (Al, Mn, Pt, Sn, Ir or the like) is the substance that is weakly magnetized in a magnetic field direction when it is brought into the magnetic field and is demagnetized when the application of the magnetic field is released. Specifically, this substance is weakly attracted to a magnet. In other words, this substance is magnetized with a polarity opposite to that of the magnet, but has weak polarity when it comes into contact with the magnet, and is demagnetized and has almost no tendency to adhere to the magnet when it is separated from the magnet.

The diamagnetic substance (Ag, Pb, Zn, Cu, salt or the like) refers to a substance that is magnetized with a polarity opposite to that of a magnetic field through the application of the magnetic field. In other words, the diamagnetic substance may be considered to be a substance that is magnetized with the same polarity as the magnet and weakly repels the magnet when it comes into contact with the magnet, but does not substantially react with industrially available magnetic force.

The steel head of a cartridge is composed of Fe as the main component thereof, and contains carbon in the range of 0.2%-2.0% or more, which is more than the amount of carbon in wrought iron. Accordingly, the steel head may be considered to be a ferromagnetic substance.

The head is responsible for half or more of the volume of a bullet coated with copper (Cu). The copper coating prevents the head from directly contacting a magnet, and the thickness of the copper coating does not affect the polarity of the magnetized head.

Meanwhile, the cartridge case may be considered to be a diamagnetic substance when it is made of a zinc-copper alloy, but exhibits the properties of a paramagnetic substance when it contains large amount of aluminum, tin and manganese. None of these substantially adhere to a magnet, nor do they affect the polarity of a head.

From the above facts, it is critical to create a magnetic field, which is intentionally controlled, and particularly in which polarities are intentionally oriented, at an area near a cartridge passage hole, at which the greatest number of cartridges are separated, so as to hold one cartridge to be transferred while promptly separating the remaining cartridges.

Specifically, since there is a need to enable a magnetic field, which is created for the adherence, transfer and arrangement of cartridges, to offer an effect of substantially screening cartridges at an area near a cartridge passage hole, which is the major obstacle, in order to optimize the performance and efficiency of a magnetic slope conveyor, it is critical to concentrate the magnetic field, of which the polarity, orientation and density are controlled, on the head passing through the cartridge passage hole.

The present invention has solved the above problem by providing a magnetizing controller, which includes controllable electromagnets, which are capable of creating a controlled magnetic field at areas above and under a hole sifter.

The ideal structure is constructed such that electromagnets and an electromagnet controller are embedded in an idle roller, which supports a transfer track constituted by a plurality of conveyor units connected to each other, the relative position between a permanent magnet disposed on the conveyor unit and a cartridge passage hole is detected so as to determine the current position of a head when the permanent magnet passes through the cartridge passage hole, and a magnetic field, at least one of polarity, orientation and density of which is controlled, is supplied. This function may be fulfilled by the supply of DC power from an external independent actuating module, which is defined as a magnetizing controller.

The magnetizing controller, which is an actuating module capable of rotating an electromagnet module, which is able to control one of the polarity, orientation and density of a magnetic field based on the detected position of a permanent magnet moving along a slope track, is disposed on the rear surface (inner surface) of the transfer track, and is configured to be rotated or swung so as to vary the angle of the electromagnet in accordance with the operation of a conveyor unit, if necessary.

From a broader macroscopic viewpoint, each of the magnetizing controllers may be disposed so as to vary the average intensity of a magnetic field, which is created by the magnetizing controllers, in accordance with the slope of the transfer track at a level of the magnetizing controller.

Accordingly, it is possible to provide the optimal magnetic force in accordance with the position of a magnetizing controller or a sifter (including a slit, which will be described later) and the expected distribution of cartridges on the transfer track, and it is possible to increase the speed of a conveyor.

In addition to the above-described solution, a slit sifter, which is a primary physical arranging device, a demagnetizer adapted to increase the speed of separation of cartridges from a conveyor and to reduce damage to cartridges during the procedure for separating the cartridges, and additional technical components and combinations thereof, which support the technical idea of the present invention, will be described below with reference to the accompanying drawings.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

In order to assist in specifically explaining means for solving the above-described problems, embodiments of the present invention will be described in detail with reference to the accompanying drawings.

However, the components and the combinations thereof which are expressed by specific technical terms in the embodiments, which will be disclosed below, should not be construed as restricting the technical idea of the present invention.

Figure 1:
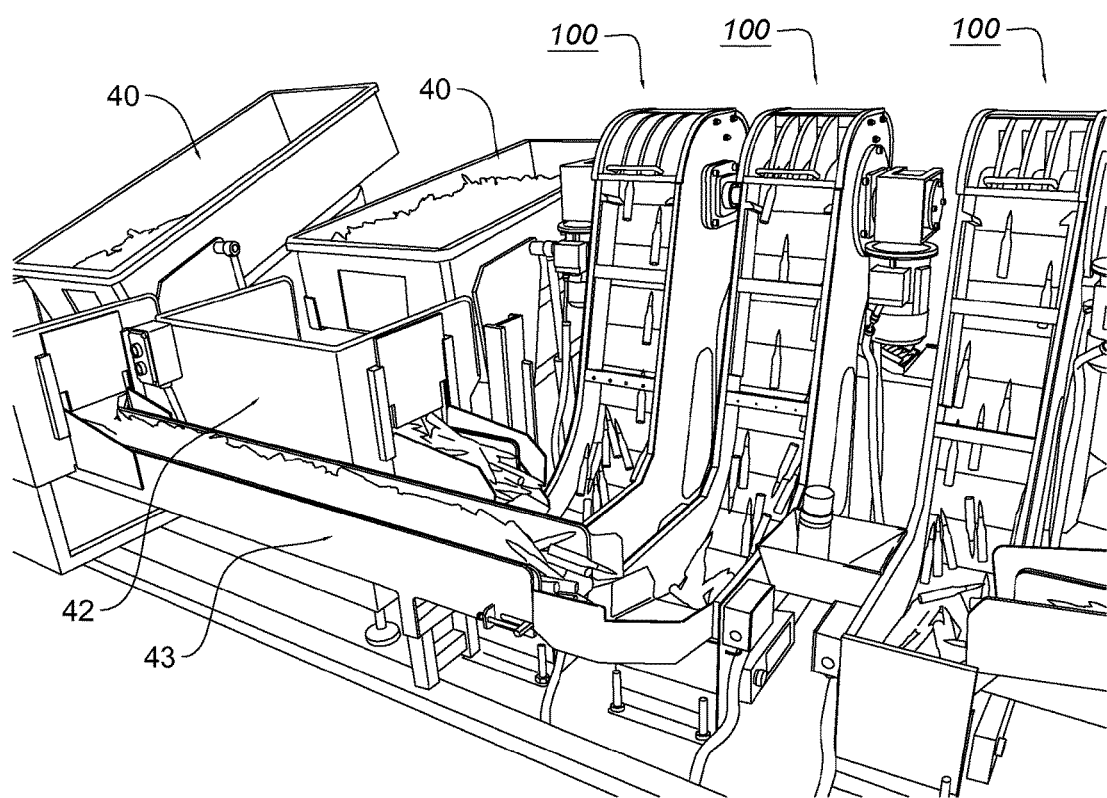
FIGS. 1 and 2 are front and rear perspective views showing a cartridge-supplying apparatus into which an apparatus for arranging and transferring cartridges according to the present invention are incorporated.
Figure 2:
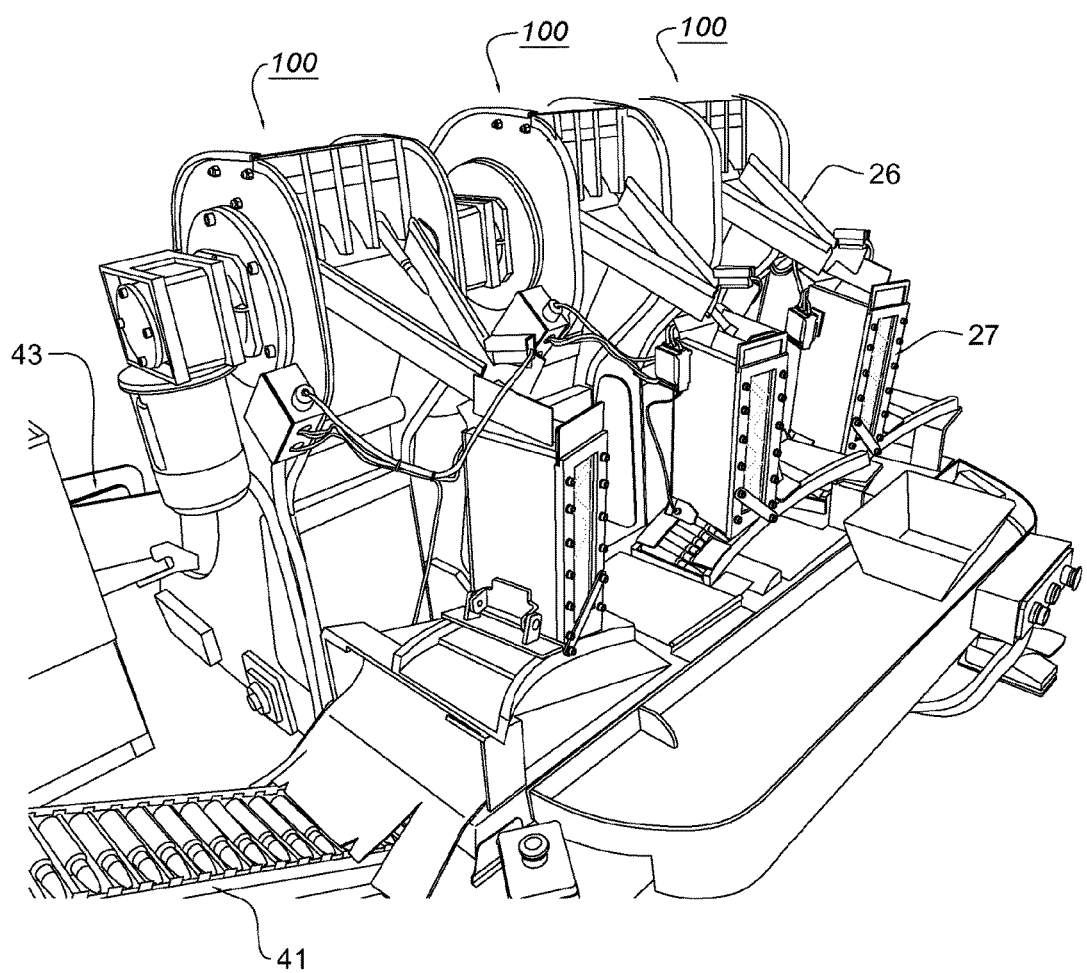

FIGS. 1 and 2 show a cartridge-supplying apparatus suitable for manufacturing cartridge belts, comprising three apparatuses 100 for arranging and transferring ammunition according to the present invention.

Referring to FIG. 1 (front side) and FIG. 2 (back side), when it is intended to manufacture a cartridge belt in which two kinds of cartridges are arranged (for example, common cartridges and tracer cartridges for a heavy machine gun, having a bullet diameter of 12.7 mm) in a fashion in which one tracer cartridge is arranged for every several common cartridges, the cartridges have to be supplied side by side in the width direction of the cartridges.

Cartridges, which are supplied in the state of being arranged in a disordered manner in a cart, are introduced into bottom areas of slope conveyors 10 of two apparatuses for arranging and transferring common cartridges and one apparatus for arranging and transferring tracer cartridges. The cartridges are obliquely arranged and transferred in one set of four cartridges while being lifted by magnets.

Figure 3:
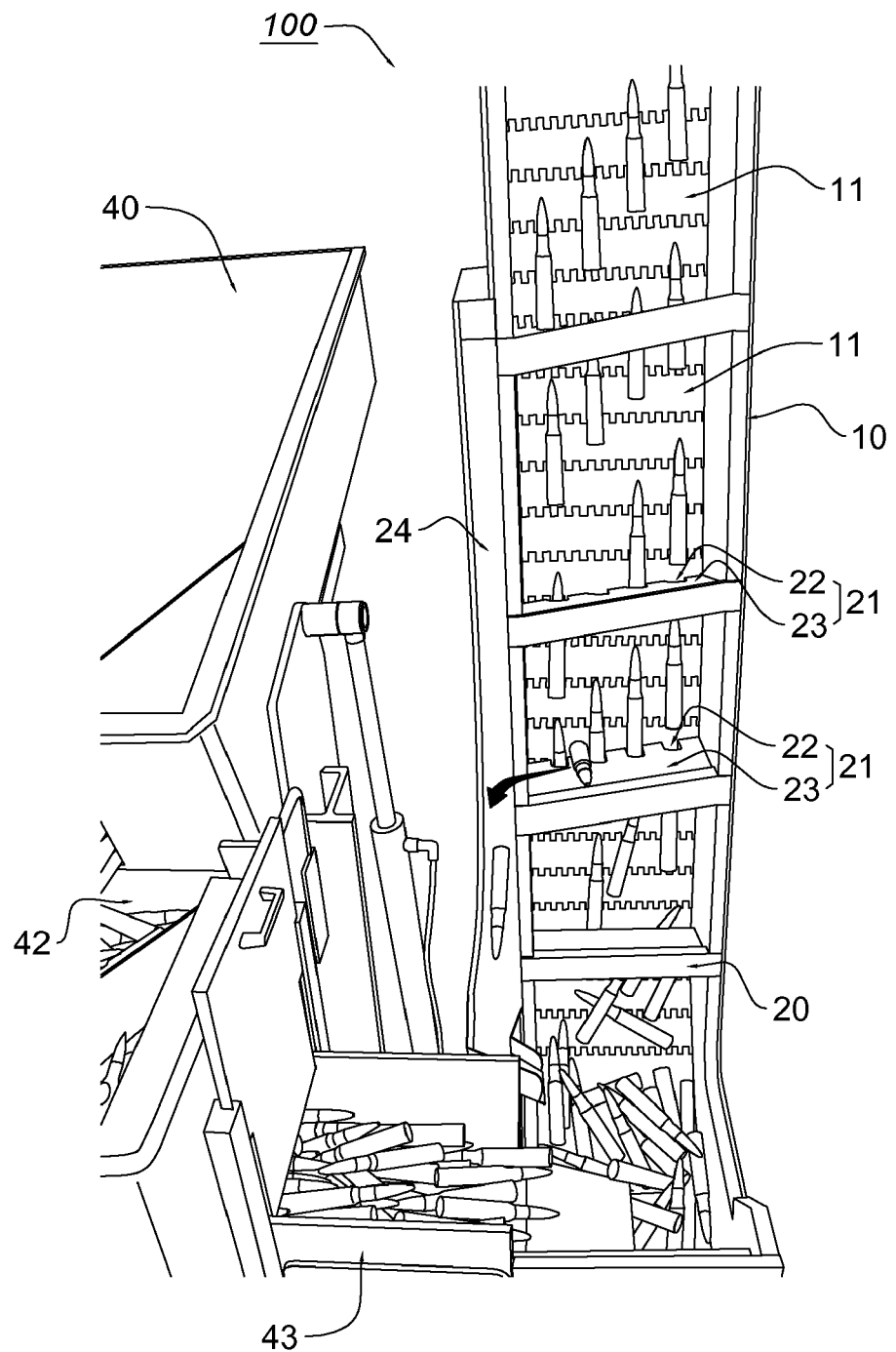
FIG. 3 is a front view showing cartridges, which are arranged and moved along a transfer track of the apparatus according to the present invention.
Figure 4:
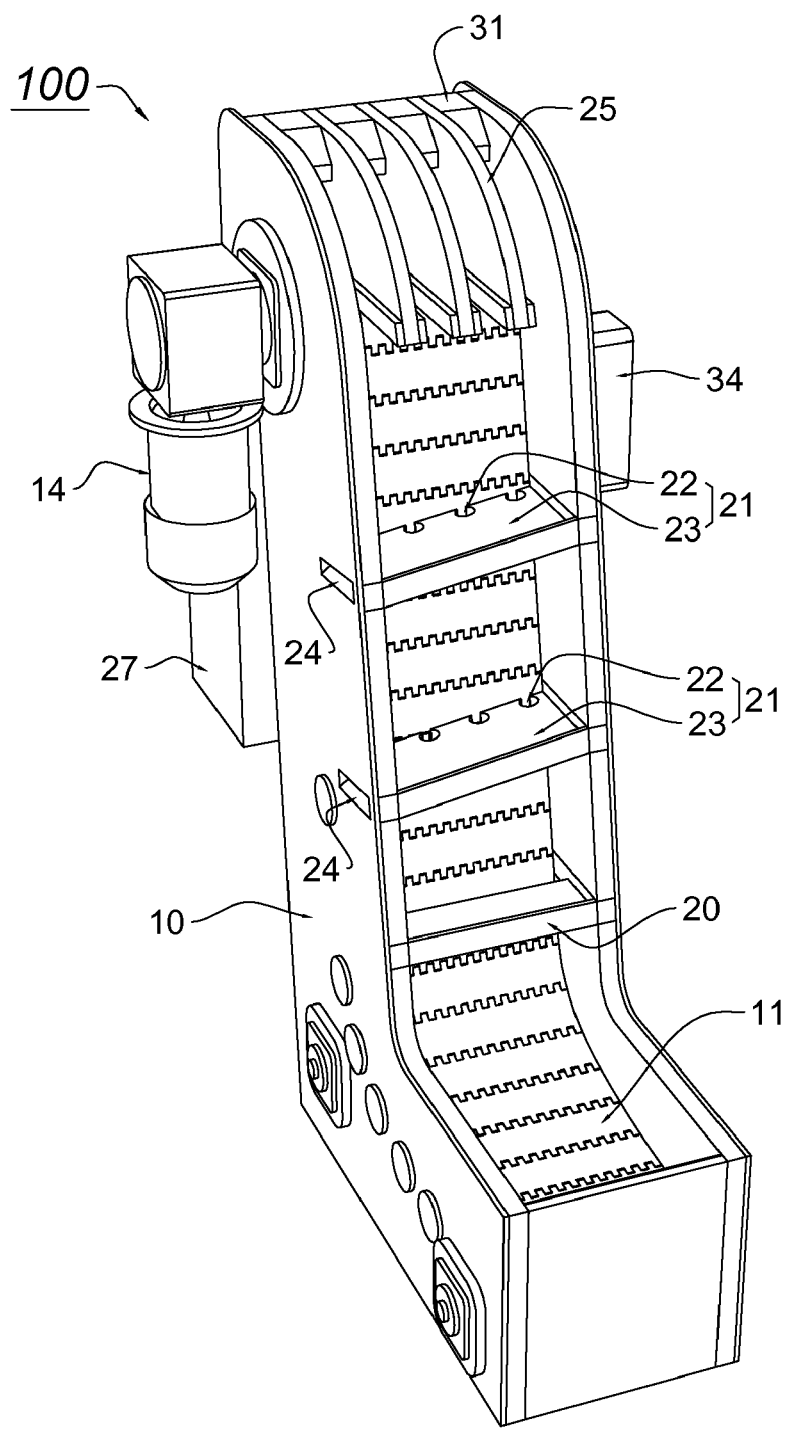
FIGS. 4 to 8 are a right cross-sectional view, left and right perspective views and a fragmentary view of the apparatus according to the present invention.
Figure 5:
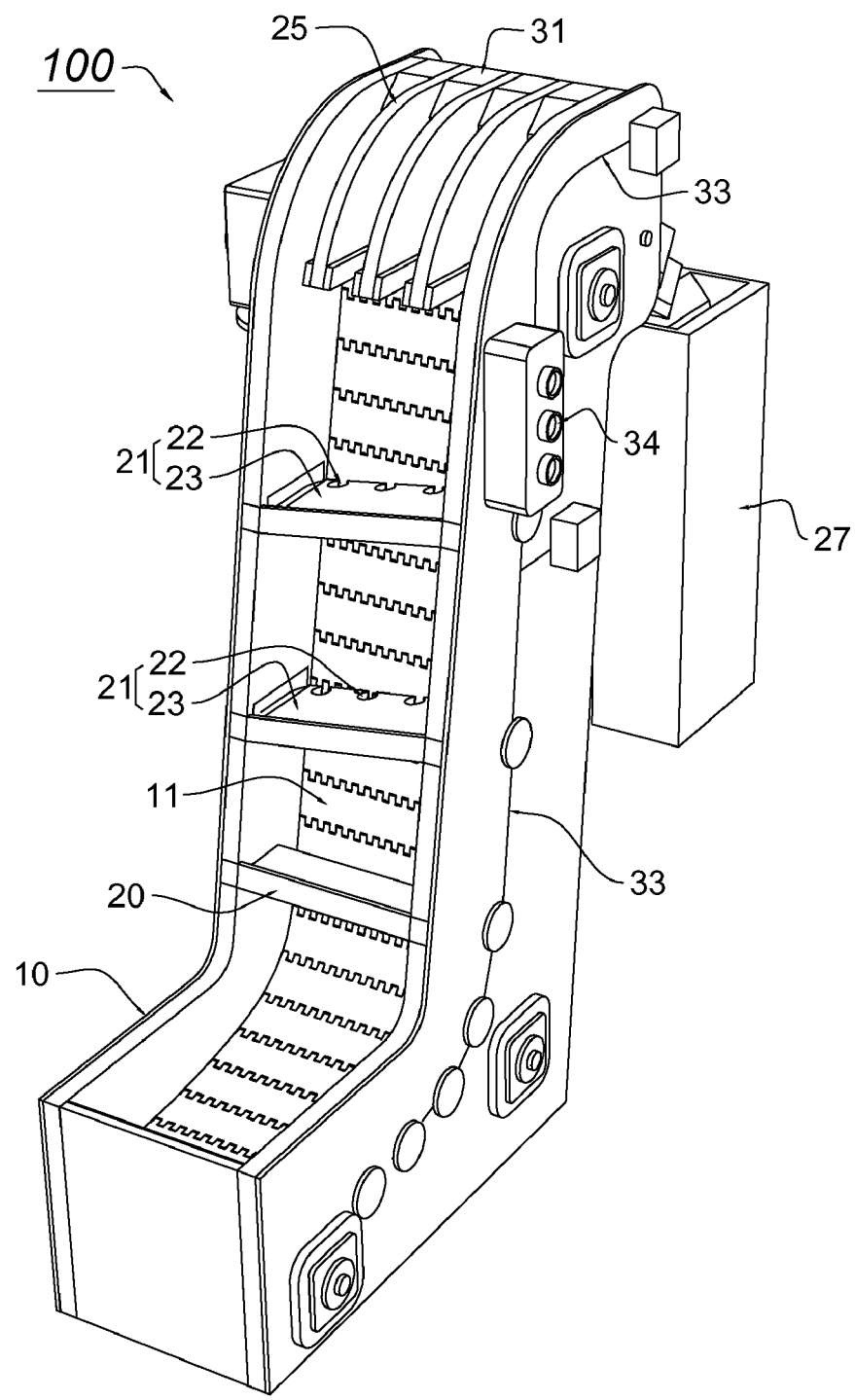

FIG. 3 is a front enlarged view of a transfer track plane of the slope conveyer, which shows the state in which cartridges are arranged and transferred in the above-described manner.

The slope conveyer 10 is configured into an inclined endless track so as to lift upward cartridges placed on the transfer track section using magnetic force. Although not specifically shown in the drawings, the transfer track section of the conveyor refers to a track section on which cartridges are placed, that is, the outer track section of the transfer track, which is exposed to face upward. The hidden track section, which is disposed in the apparatus so as to face downward, serves as a returning track section which is disposed inside the entire transfer track. The returning track section is not relevant to the arrangement and transfer of cartridges, and is not disposed near critical components, which will be described later, as can be appreciated from the side cross-sectional view.

Referring to the side cross-sectional view, which shows all the apparatuses in three dimensions, the transfer track section may have a non-constant angle of inclination from the bottom area, into which cartridges are introduced to the top area, from which the cartridges escape, and the transfer track section may be provided with at least one hole sifter 21, which is positioned close to the outer surface of the transfer track section (the surface that is exposed to the outside and to which cartridges are adhered).

In this embodiment, a slit sifter 20, which serves to evenly arrange cartridges, which are being lifted in an agglomerated state, is disposed close to the outer surface of the transfer track section, like the hole sifter 21 positioned above the slit sifter 20, so as to enable an appropriate number of cartridges to enter cartridge passage holes 22 formed in the hole sifter 21. In other words, the number of slit sifters is not necessarily limited to one, and any number of slit sifters 20 is preferably disposed below the lowermost hole sifter 21.

The hole sifter 21 includes the cartridge passage holes 22, which are positioned above the transfer track and over which permanent magnets 12 pass. The cartridge passage holes 22 may be configured to have a shape of a tunnel, the bottom side of which is defined by the outer surface of the transfer track section. The height of the cartridge passage hole is preferably greater than the diameter of the cartridges, and the width of the open bottom side of the cartridge passage hole, that is, the width of the bottom side of the tunnel shape, is appropriately controlled by repeated experiments in consideration of magnetic force, the speed of the conveyer, and the weight of the cartridges. Preferably, the width of the cartridge passage hole is reduced in the upward direction from the open bottom side thereof so as to allow only one cartridge to narrowly pass through the cartridge passage hole.

The detailed structure of the slope conveyer 10 will now be described. The slope conveyer 10, which is constituted by a plurality of conveyer units 11 connected to each other, defines an endless track having the plurality of permanent magnets 12, which creates magnetic fields oriented toward the outside of the track, mounted therein.

Although the permanent magnets 12 are shown in this embodiment as being arranged on the inner surfaces of the conveyer units 11, they may also be configured to have a thin thickness so as to be embedded in the conveyer units 11, depending on the properties or shapes thereof.

In order to prevent the surface area of the conveyer unit 11, which is magnetized by the permanent magnets from being unnecessarily increased, the conveyer unit 11 should be made of a paramagnetic substance at areas thereof that are positioned in front of and behind the permanent magnets 12 in the direction in which the transfer track travels. Otherwise, in the case of handling light cartridges, the cartridges would be adhered to the permanently magnetized areas in front of and behind the permanent magnets 12 and would be collectively lifted one after another.

A magnetizing controller 30, which plays a critical role in offering the overall effects of the present invention, will now be described.

The magnetizing controller 30 may include at least one magnetizing controller, which is disposed along the transfer track. Preferably, the magnetizing controller 30 may be disposed opposite the at least one hole sifter 21 with respect to the transfer track, that is, on the inner surface of the transfer track, as viewed from the side cross-sectional view.

Although many views partially or entirely show the magnetizing controller 30, the configuration shown in the drawings is not necessarily optimal. The magnetizing controller 30 may, of course, be modified into various optimal configurations depending on the shape of the conveyer unit 11, shapes of the conveyer units 11 or the permanent magnets 12 arranged on the conveyer units 11, whether driving force required to rotate or swing the magnetizing controller 30 is transferred from the conveyer units 11, which are being traveled or from support wheels or idle wheels of the conveyer units 11, or whether the magnetizing controller 30 is controllably driven by an additional motor and gear box in order to assure free rotation or swinging movement.

In consideration of the requirement to operate the magnetizing controller 30 other than items that are changeable in design, the magnetizing controller 30 should be provided with the number of electromagnets that is required in order to create controlled magnetic fields oriented toward areas above and under the hole sifter 21.

In a more preferred embodiment, the magnetizing controller 30 may be disposed so as to vary the intensity of the magnetic field depending on the slope of the transfer track at the level of the magnetizing controller 30, and may be independently driven by a motor or may be rotated or swung in conjunction with the conveyer unit 11. The interlocking structure may be usefully used in changing the angles of magnetic poles of the electromagnet 32, only the magnetic poles of which are controllable, without using a motor or a gear box.

Figure 6:
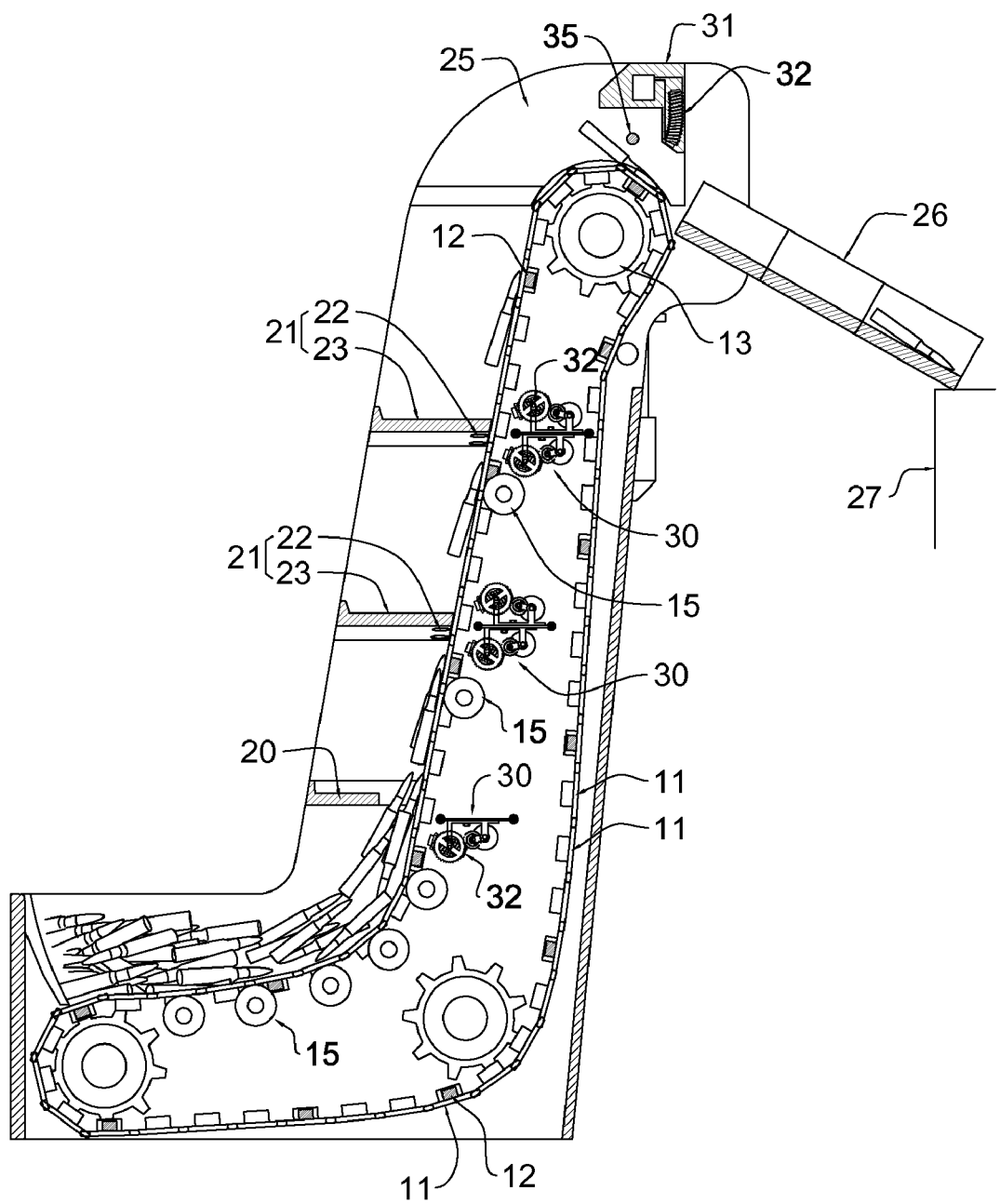
Figure 7:
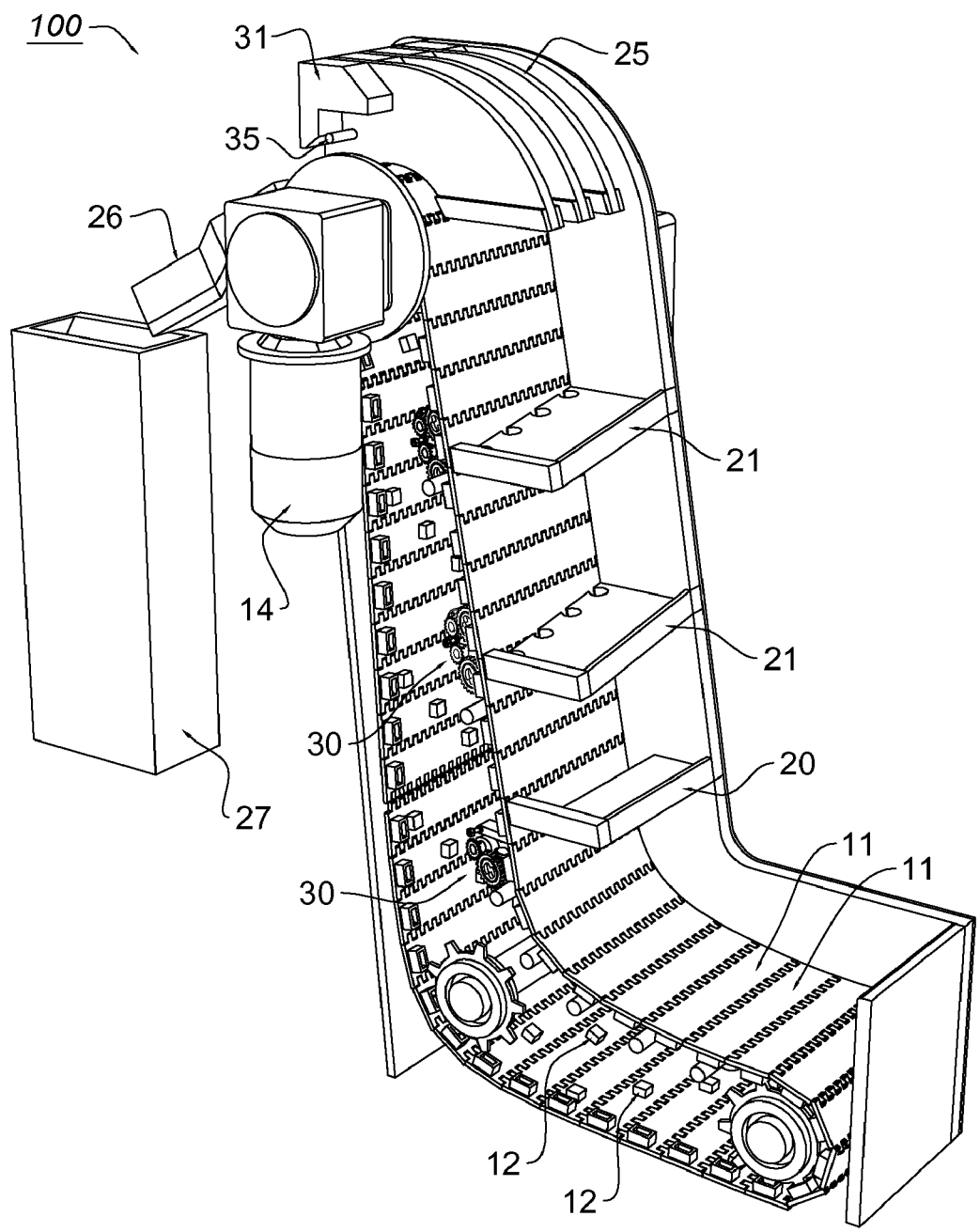
Figure 8:
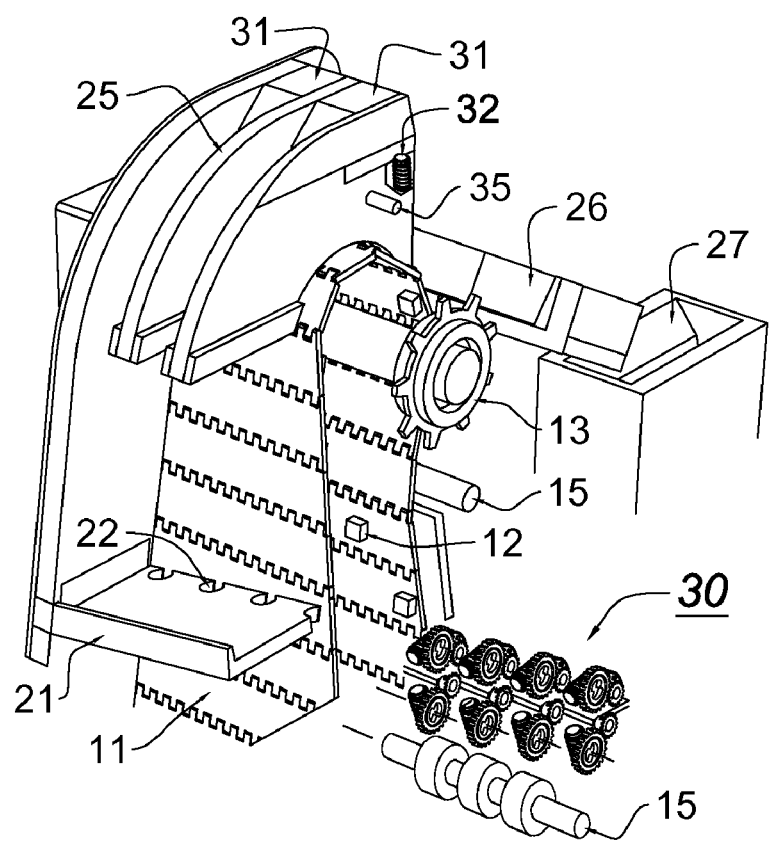
Figure 9:
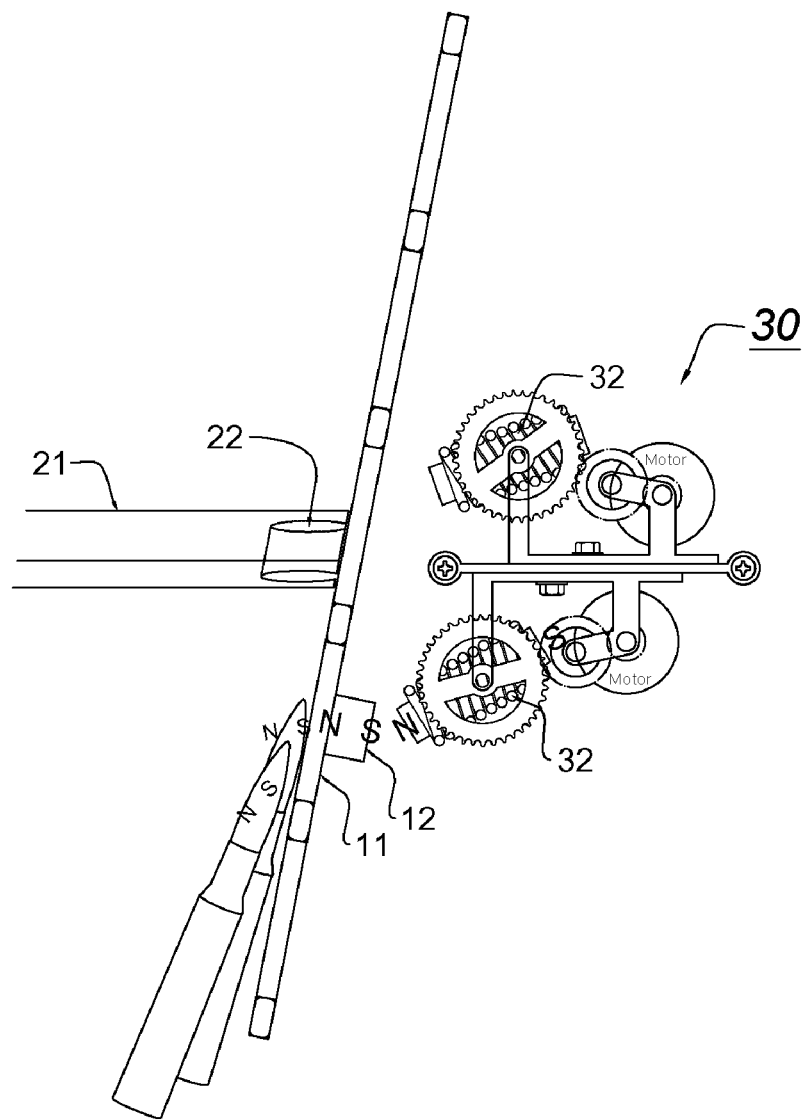
FIGS. 9 to 12 are side cross-sectional views illustrating a magnetizing controller and the peripheral components and operation thereof.
Figure 10:
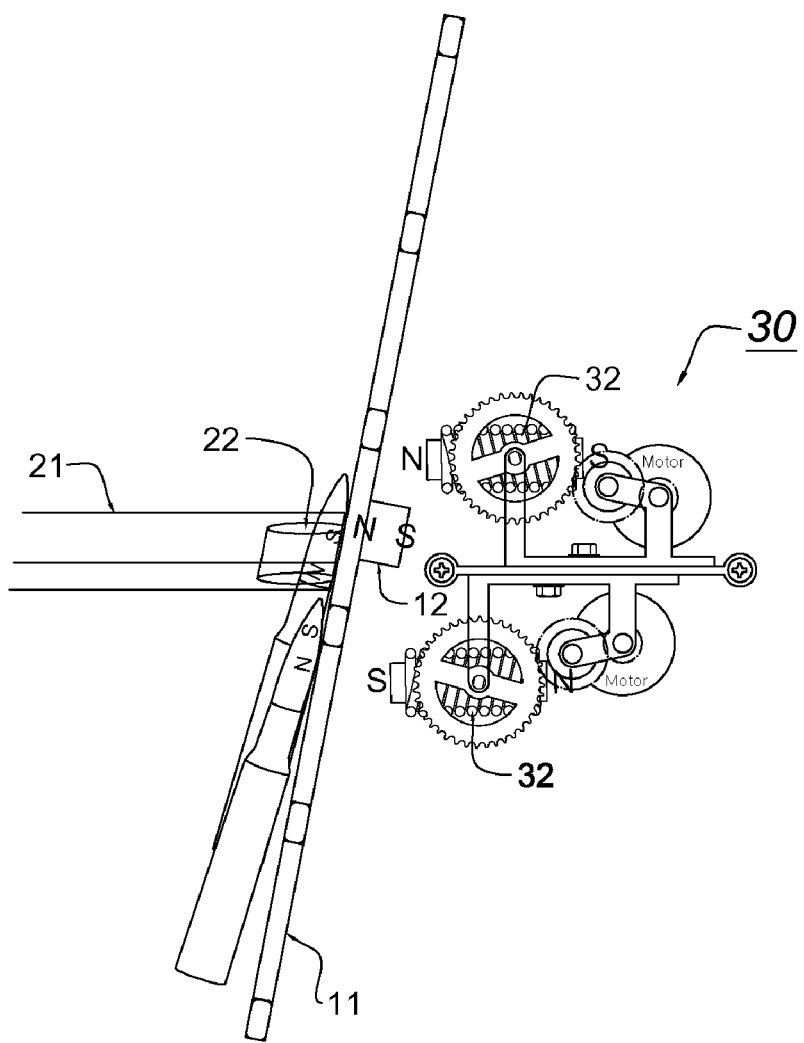
Figure 11:
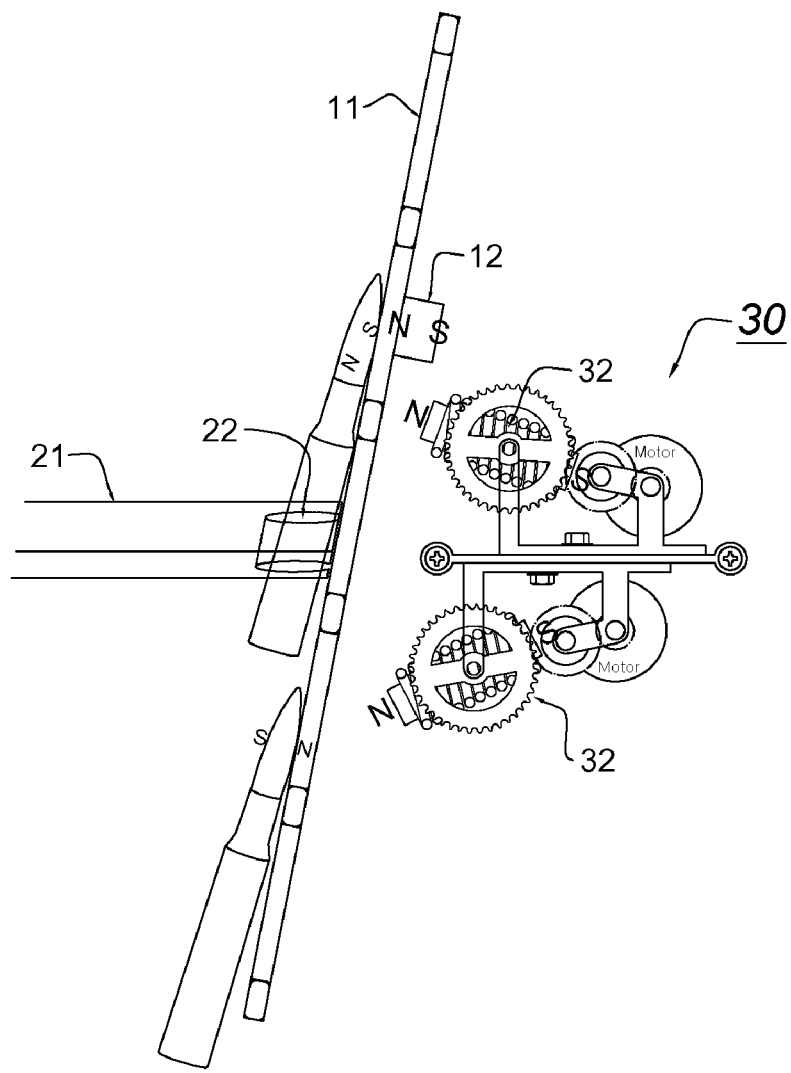
Figure 12:
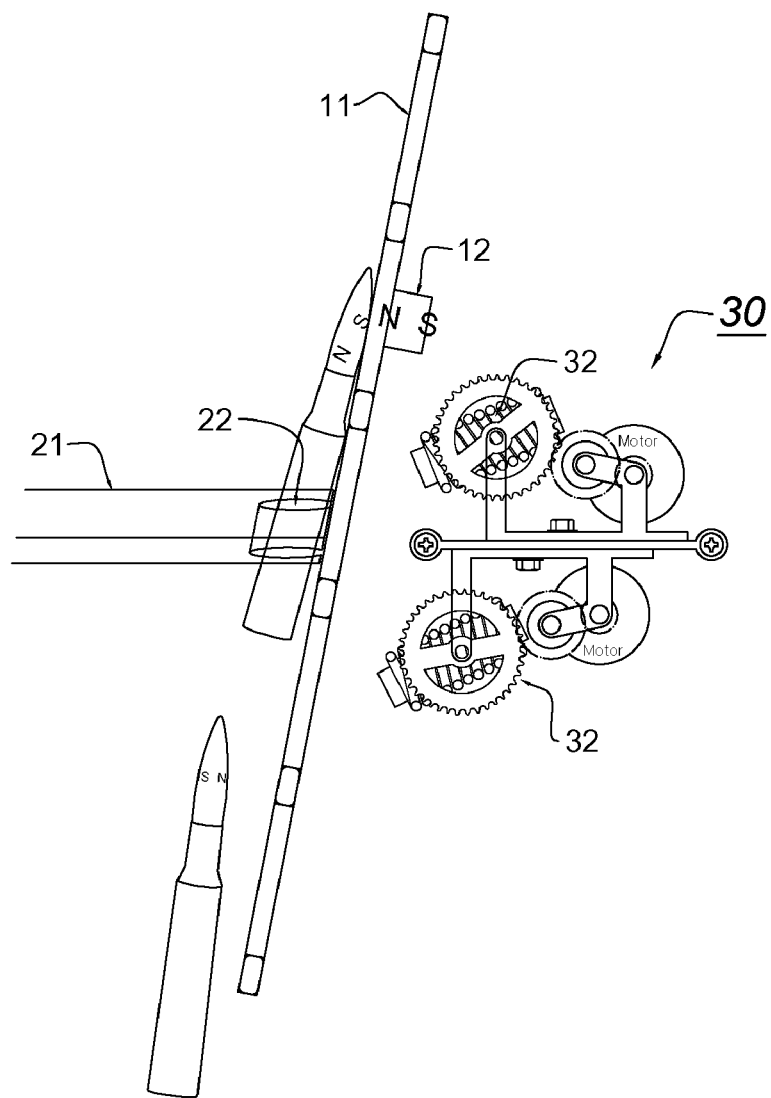

A specific example of design of the magnetizing controller will now be described with reference to the accompanying drawings. Referring to the side cross-sectional view shown in FIG. 6, conveyor units 11, in which one set of conveyor units includes four conveyor units, are respectively provided with the permanent magnets 12, and are repeatedly connected to each other with the result that four cartridges are transferred in an obliquely arranged state by one set of conveyor units 11. Referring to FIGS. 6 and 8, the magnetizing controller 30 is constructed to create auxiliary magnetic fields above and under each permanent magnet using two electromagnets. More specifically, a total of eight electromagnets are disposed above and under the hole sifters 21 such that, every time each of the permanent magnets 12 passes over the cartridge passage hole 22 in the hole sifter 21, a pair of electromagnets detects the position of the associated permanent magnet 12, thereby controlling at least one of the polarity, orientation and density of the magnetic field.

The initial relative position between the cartridge passage holes and the electromagnets is determined in advance in consideration of the initial installation position of the magnetizing controller 30. In addition, in most cases a specific permanent magnet 12 is securely disposed at a predetermined vertical and horizontal position, which is determined in advance for a particular conveyor unit.

Accordingly, since the magnetizing controller 30 may easily derive the relative position and angle between the permanent magnet and the electromagnets in accordance with variance of the relative position between the cartridge passage hole and the conveyor unit 11, the magnetizing controller 30 may control at least one of the polarity, orientation and density of the magnetic field, which can be realized by detection and adjustment of an angle using a relative position detector or an interlocking link unit, which is controlled in advance, and by electronic cooperative control of a DC power line 33 for supplying power to the entire magnetizing controller 30, including the electromagnets.

An example of a control scenario that frequently occurs will now be described with reference to FIGS. 9 to 12, which illustrate the cooperative operation between the electromagnets and the conveyor unit.

For convenience of explanation, the drawings show only one transfer track, that is, only one permanent magnet 12, the conveyor unit 11 including the permanent magnet 12, only one cartridge passage hole 22 provided in the transfer track, a pair of electromagnets 32, which are disposed on the inner surface of the transfer track one above the other, and two agglomerated cartridges, which frequently occurs and should be overcome by the objects of the present invention.

With the exception of rare cases, the two agglomerated cartridges may almost always be classified into an upper cartridge, which is positioned at a relatively high level (which is positioned closer to the permanent magnet 12), and a lower cartridge.

The critical task to be achieved is to pull down the lower cartridge before the upper cartridge passes through the cartridge passage hole 22.

The lower electromagnet 32, which is positioned at a lower level based on the vertical line extending through the cartridge passage hole 22, is magnetized with the same polarity as that of the permanent magnet 12 when the permanent magnet 12 initially approaches the electromagnet 32, but is magnetized with a polarity opposite to that of the permanent magnet 12 after the permanent magnet 12 passes over the electromagnet 32. Whether or not the polarity of the electromagnet 32 follows the permanent magnet 12 depends on the magnetizing controller 30.

Consequently, the lower cartridge is attracted to the lower electromagnet 32, whereas the upper cartridge more easily enters the cartridge passage hole 22 due to the inverted magnetic field.

The upper electromagnet 32 is magnetized with the same polarity as the permanent magnet 12 when the upper cartridge passes through the cartridge passage hole 22, but releases the magnetic force for a while after the upper cartridge passes through the cartridge passage hole 22. The upper electromagnet is magnetized with a polarity opposite to that of the permanent magnet 12 soon thereafter.

Both the upper and lower electromagnets 32 may be controlled to increase the density of magnetic field from the time at which the permanent magnet 12 approaches the electromagnet 32 to the time at which the permanent magnet 12 passes over the electromagnet 32. Thereafter, the upper and lower electromagnets 32 may be controlled to eliminate the density of the magnetic field after the permanent magnet 12 passes over the electromagnet 32 and to continue to decrease the density of the magnetic field as the permanent magnet 12 moves away from the electromagnet 32. As a result, the electromagnet provides a series of auxiliary actions of appropriately attracting a cartridge, which is lifted (which approaches the electromagnet 32), keeping the cartridge adhered to the permanent magnet 12, and finally appropriately pushing up the cartridge, which is moved away from the electromagnet 32.

The magnetic polarity, orientation and density of the electromagnet 32 may be finely controlled in accordance with the speed of the conveyor unit 11, the distance between the electromagnet 32 and a cartridge, and the magnitude of the magnetizing properties of a bullet, which is a ferromagnetic substance. Consequently, the magnetizing controller 30 may ideally handle cartridges that are agglomerated at an area near the cartridge passage hole 22, where there is the highest possibility that cartridges will fail to be transferred in a regularly arranged state.

Figure 13:
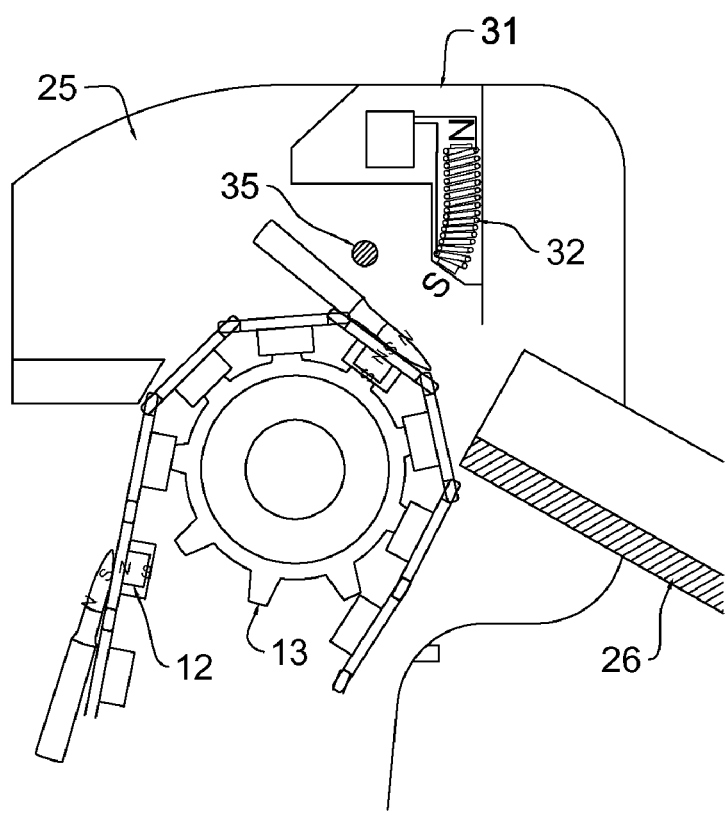
FIGS. 13 and 14 are side cross-sectional views illustrating a demagnetizer and the peripheral components and operation thereof.
Figure 14:
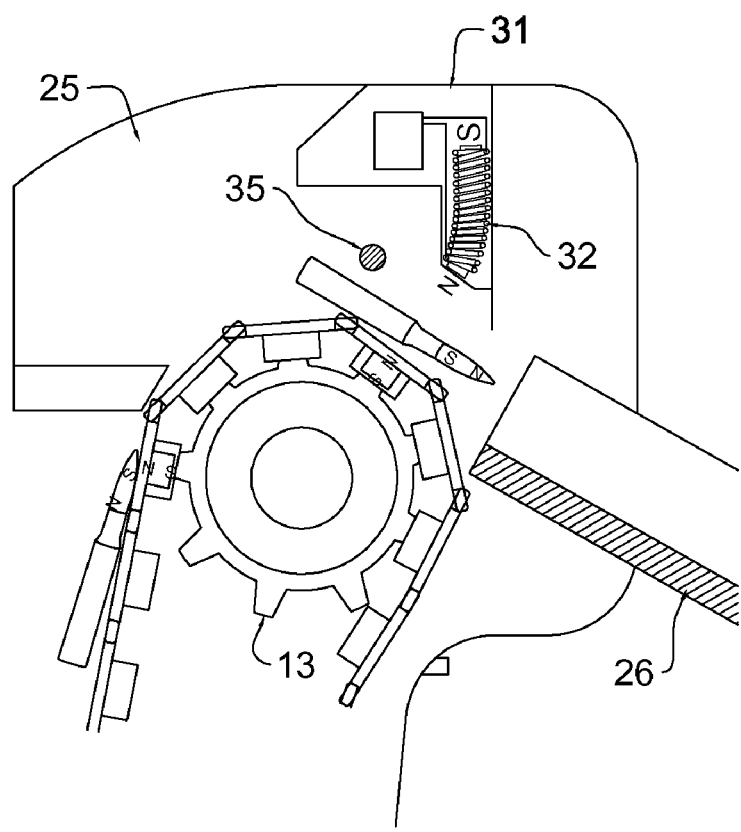

A demagnetizer 31, which is disposed at the top of the slope conveyor 10, will be finally described with reference to FIGS. 13 and 14. The demagnetizer 31 may be configured to include an electromagnet 32, which is capable of controlling the polarity and density of a magnetic field and the times at which the magnetic field is created and released. The principal function of the demagnetizer 31 is to allow cartridges that pass over the top of the slope conveyor 10 to promptly escape from the top and to be introduced into a concentrative slope way 26, which is provided at an outlet.

When a cartridge arrives at the point at which the cartridge has to be separated from the permanent magnet 12, the electromagnet 32 creates an intensive magnetic field having a polarity opposite to that of the magnetic field created at the cartridge, thereby attracting the cartridge. As a result, the cartridge is concurrently subjected to magnetic attraction from the permanent magnet 12, which is disposed thereunder, and the demagnetizer 31, which is disposed thereunder, and thus does not adhere to either of them.

Thereafter, the electromagnet 32 rapidly decreases the magnetic field so as to attain a balance in the magnetic field between the electromagnet 32 and the permanent magnet 12, which is moved away therefrom. The magnetized cartridge, which is lifted by attraction from the electromagnet 32, naturally falls down owing to gravity. As the magnetized cartridge falls down, magnetic field thereof is increasingly diminished. While every transfer line is subjected to the action of the electromagnet 32, terminal partition plates 25 serve to prevent a cartridge separated from one transfer track from interfering with the escape path of the adjacent cartridge.

The apparatus 100 according to the present invention include a horizontal bar 35 as a final safety device for restricting the inclination of cartridges. The horizontal bar 35 serves to forcibly push down cartridges so as to prevent the cartridge from being jammed under the inlet of the concentrative slope way 26 when the cartridge is not separated from the permanent magnet 12 to the last due to malfunction of the electro magnet 32.

The concentrative slope way 26, which is disposed at an appropriate location above the slope conveyor 10, serves to receive cartridges, which have passed over the top of the transfer track, and to discharge the cartridges one by one along a path having a reduced width. A loading magazine 27, which serves to receive cartridges from the concentrative slope way 26 and to allow the cartridges to fall down, allows the cartridges to be transferred side by side in a lateral direction rather than in a longitudinal direction. Since the concentrative slope way and the loading magazine are well described in Patent Document 1, which was introduced above as a related art, it will be understood that modifications and variations will occur to those skilled in that art by referring to the Patent Document 1.

As is apparent from the above description, since the present invention may provide only the optimized magnetic force during procedures of arranging, transferring and separating cartridges, it is possible to minimize physical force and friction, which are conventionally used to release the magnetic force. Consequently, damage to cartridges is reduced, and the possibility that agglomerated cartridges will fail to be arranged at a sifter is lowered, resulting in increased transfer speed of a conveyor.

As a result, since the operating speed up to the final procedure of loading and supplying cartridges may be remarkably improved, it is possible to realize a high-performance ammunition-supplying apparatus, which offers excellent productivity compared to a conventional slope conveyor type ammunition-supplying apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. An apparatus for arranging and transferring cartridges, comprising:
   a slope conveyor, which is configured into an endless track structure so as to lift cartridges placed on a transfer track thereof using magnetic force;
   a plurality of permanent magnets, which are arranged on the slope conveyor so as to create a magnetic field outside the transfer track;
   one or more hole sifters, which are disposed near an outer surface of the transfer track and which have cartridge passage holes formed at locations through which the plurality of permanent magnets pass; and
   magnetizing controllers including electromagnets, which are disposed above and under the hole sifters and are assigned to the plurality of permanent magnets, respectively, wherein the magnetizing controllers detect a position of each of the plurality of permanent magnets when each of the plurality of permanent magnets passes through one of the cartridge passage holes, and controls the electromagnets to create a magnetic field, having polarity, orientation and density at least one of which is controlled, above or under the hole sifters.

2. The apparatus according to claim 1, further comprising:

a slit sifter, which is disposed near the outer surface of the transfer track under the lowermost hole sifter; and a concentrative slope way, which is disposed at an upper portion of the slope conveyor so as to receive and discharge the cartridges, which have passed over the top of the transfer track, through a path having a reduced width.

3. The apparatus according to claim 1, wherein the slope conveyor includes a plurality of conveyor units, which are connected to each other and each of which includes at least one permanent magnet, and each of the magnetizing controllers is disposed opposite a corresponding one of the one or more hole sifters with respect to the transfer track.

4. The apparatus according to claim 3, wherein the conveyor unit is composed of a paramagnetic substance at portions thereof through which the plurality of permanent magnets pass, and each of the magnetizing controllers is rotated or swung so as to vary an angle of a magnetic pole of each of the electromagnets in accordance with movement of the conveyor unit.

5. The apparatus according to claim 4, wherein the transfer track has an angle of inclination, which is not constant from a bottom of the transfer track, into which the cartridges are introduced, to the top of the transfer track at which the cartridges are separated from the transfer track, and each of the magnetizing controllers varies an average intensity of a magnetic field in accordance with a slope of the transfer track at a level of each of the magnetizing controllers.

6. The apparatus according to claim 2, further comprising a demagnetizer, which is disposed at the top of the slope conveyor so as to create a magnetic field, which has a polarity opposite to a polarity of a magnetic field created at a cartridge passing through the top of slope conveyor.

* * * * *